(12) United States Patent
Shi (10) Patent No.: US 10,783,206 B2
(45) Date of Patent: Sep. 22, 2020

(54) METHOD AND SYSTEM FOR RECOMMENDING TEXT CONTENT, AND STORAGE MEDIUM

(71) Applicant: TENCENT TECHNOLOGY (SHENZHEN) COMPANY LIMITED, Shenzhen (CN)

(72) Inventor: Jiqun Shi, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 155 days.

(21) Appl. No.: 15/975,501

(22) Filed: May 9, 2018

(65) Prior Publication Data
US 2018/0260490 A1 Sep. 13, 2018

Related U.S. Application Data

(63) Continuation of application No. PCT/CN2017/088969, filed on Jun. 19, 2017.

(30) Foreign Application Priority Data

Jul. 7, 2016 (CN) .......................... 2016 1 0539075

(51) Int. Cl.
*G06F 16/954* (2019.01)
*G06N 20/00* (2019.01)
(Continued)

(52) U.S. Cl.
CPC ............ *G06F 16/954* (2019.01); *G06F 15/76* (2013.01); *G06F 16/335* (2019.01); *G06F 16/36* (2019.01);
(Continued)

(58) Field of Classification Search
CPC .... G06F 16/954; G06F 16/36; G06F 16/9535; G06F 16/335; G06F 40/30; G06F 15/76; G06N 20/00; H04L 67/26
See application file for complete search history.

(56) References Cited

U.S. PATENT DOCUMENTS 6,326,988 B1 * 12/2001 Gould ................. G06F 3/04815
715/850
8,589,378 B2 11/2013 Liu et al.
(Continued)

FOREIGN PATENT DOCUMENTS

| CN | 102495872 | 6/2012 |
| CN | 102611785 A | 7/2012 |

(Continued)

OTHER PUBLICATIONS

International Search Report dated Aug. 21, 2017 in PCT/CN2017/088969 filed Jun. 19, 2017. (With English Translation).
(Continued)

*Primary Examiner* — Irete F Ehichioya
*Assistant Examiner* — Antonio J Caiado
(74) *Attorney, Agent, or Firm* — Oblon, McClelland, Maier & Neustadt, L.L.P.

(57) ABSTRACT

A method for information recommendation is described. Processing circuitry obtains a first text content associated with which a recommendation is to be provided, segments the first text content into multiple words, and predicts a distribution of the first text content in a multi-dimensional topic space based on the multiple words. Further, the processing circuitry calculates a correlation between the first text content and a second text content in an information pool according to the distribution of the first text content in the multi-dimensional topic space. Then, the processing circuitry determines whether to output the second text content
(Continued)

as the recommendation associated with the first text content according to the correlation.

16 Claims, 4 Drawing Sheets

(51) Int. Cl.
    *G06F 16/36*         (2019.01)
    *G06F 16/9535*     (2019.01)
    *G06F 16/335*      (2019.01)
    *G06F 15/76*         (2006.01)
    *G06F 40/30*         (2020.01)
    *H04L 29/08*        (2006.01)

(52) U.S. Cl.
    CPC .......... *G06F 16/9535* (2019.01); *G06F 40/30* (2020.01); *G06N 20/00* (2019.01); *H04L 67/26* (2013.01)

(56) References Cited

U.S. PATENT DOCUMENTS

| | | | | |
|---|---|---|---|---|
| 9,449,080 | B1* | 9/2016 | Zhang | G06F 40/20 |
| 10,216,724 | B2* | 2/2019 | Sinha | G06F 40/232 |
| 2010/0280985 | A1* | 11/2010 | Duchon | G06Q 10/10 |
| | | | | 706/52 |
| 2012/0221563 | A1* | 8/2012 | De | G06Q 10/06 |
| | | | | 707/728 |
| 2012/0296637 | A1* | 11/2012 | Smiley | G06K 9/6201 |
| | | | | 704/9 |
| 2015/0262069 | A1 | 9/2015 | Gabriel et al. | |
| 2016/0275433 | A1* | 9/2016 | Gil | G06F 40/30 |
| 2017/0103343 | A1* | 4/2017 | Yee | G06F 16/335 |
| 2019/0197416 | A1* | 6/2019 | Yao | G06F 16/9535 |

FOREIGN PATENT DOCUMENTS

| | | |
|---|---|---|
| CN | 102929928 | 2/2013 |
| CN | 103389975 | 11/2013 |
| CN | 103577501 A | 2/2014 |
| CN | 103678277 A | 3/2014 |
| CN | 104899273 A | 9/2015 |
| CN | 105224699 A | 1/2016 |
| CN | 105677769 A | 6/2016 |
| CN | 105721944 A | 6/2016 |
| CN | 106202394 | 12/2016 |

OTHER PUBLICATIONS

Office Action dated May 6, 2020 in Chinese Application No. 201610539075.6, with concise English translation.

* cited by examiner

METHOD AND SYSTEM FOR RECOMMENDING TEXT CONTENT, AND STORAGE MEDIUM

RELATED APPLICATION

This application is a continuation of International Application No. PCT/CN2017/088969, filed on Jun. 19, 2017, which claims priority to Chinese Patent Application No. 201610539075.6, entitled "METHOD AND SYSTEM FOR RECOMMENDING TEXT INFORMATION" filed with the Patent Office of China on Jul. 7, 2016. The entire disclosures of the prior applications are hereby incorporated by reference in their entirety.

FIELD OF THE TECHNOLOGY

This application relates to the field of computer technologies, and in particular, to a method and a system for recommending text content, and a storage medium.

BACKGROUND OF THE DISCLOSURE

With the development of Internet technologies, more data (including: texts, pictures, audios, videos, and the like) is pushed to various users through the Internet. For example, when a user is browsing a web page by using a terminal device such as a mobile phone or a PC, the user will receive various types of data pushed by a network side, such as an advertisement in a picture or video format, public service promotion information, and news. In this way, the user may learn current information and content of interest in time. Such types of data may be referred to as push information or push media content.

SUMMARY

A method for information recommendation is described. Processing circuitry of an information processing apparatus obtains a first text content based on which a recommendation is to be provided. The processing circuitry segments the first text content into multiple words, and predicts a distribution of the first text content in a multi-dimensional topic space based on the multiple words. Further, the processing circuitry calculates a correlation between the first text content and a second text content in an information pool according to the distribution of the first text content in the multi-dimensional topic space. Then, the processing circuitry determines whether to output the second text content as the recommendation associated with the first text content according to the correlation.

In some embodiments, to predict the distribution of the first text content in the multi-dimensional topic space, the processing circuitry uses a Latent Dirichlet Allocation (LDA) model.

Further, in an example, the processing circuitry calculates correlations respectively between the first text content and multiple second text contents in the information pool according to the distribution of the first text content in the multi-dimensional topic space. The processing circuitry sorts the multiple second text contents according to the correlations and outputs one or more of the second text contents according to the sorting.

To calculate the correlation between the first text content and the second text content, in an embodiment, the processing circuitry calculates the correlation as a function of a cosine distance between the first text content and the second text content in the multi-dimensional topic space. In an example, the processing circuitry calculates the correlation between the first text content and the second text content according to a formula:

$$S(x, x', v, t) = \frac{\sum_{k=1}^{n} x_k x'_k}{\sqrt{\sum_{k=1}^{n} x_k^2} \sqrt{\sum_{k=1}^{n} x_k'^2}}$$

where x is used to represent first vectors of the first text content in the multi-dimensional topic space according to a Latent Dirichlet Allocation (LDA) model, x' is used to represent second vectors of the second text content in the multi-dimensional topic space according to the LDA model, and k is used to represent indexes for the first vectors and the second vectors in summations, $$\frac{\sum_{k=1}^{n} x_k x'_k}{\sqrt{\sum_{k=1}^{n} x_k^2} \sqrt{\sum_{k=1}^{n} x_k'^2}}$$

is used to calculate the cosine distance between the first text content and the second text content in the multi-dimensional topic space.

In another embodiment, the processing circuitry calculates the correlation between the first text content and the second text content according to a cosine distance between the first text content and the second text content in the multi-dimensional topic space, a page view (PV) weight of the second text content and an overdue penalty of the second text content. In an example, the PV weight of the second text content that is determined according to a click rate of the second text content; and the overdue penalty is determined according to a released time from an initial release of the second text content.

According to an aspect of the disclosure, the processing circuitry collects a new piece of information, and obtaining text content of the new piece of information as a new second text content. Then, the processing circuitry segments the new second text content into multiple words, predicts a distribution of the new second text content in the multi-dimensional topic space; and places the new second text content into the information pool.

An apparatus for information recommendation is also described. The apparatus includes interface circuitry and processing circuitry. The interface circuitry is configured to receive and transmit signals carrying information. The processing circuitry is configured to obtain a first text content based on which to provide recommendation, segment the first text content into multiple words, predict a distribution of the first text content in a multi-dimensional topic space based on the multiple words, calculate a correlation between the first text content and a second text content in an information pool according to the distribution of the first text content in the multi-dimensional topic space, and determine whether to output the second text content as a recommendation associated with the first text content according to the correlation.

Aspects of the disclosure also provide a non-transitory computer-readable medium storing instructions which when executed by a computer cause the computer to perform the method for information recommendation.

In order to make the foregoing and other objectives, features, and advantages of this application more comprehensible, exemplary embodiments are described in detail below with the accompanying drawings.

DESCRIPTION OF EMBODIMENTS

In further explain technical means adopted in this application for achieving predetermined objectives and effects thereof, specific implementations, structures, features, and effects of this application are explained below in detail with reference to the accompanying drawings and embodiments.

With the rapid development of the Internet, network information pushed to users is growing increasingly. This makes it convenient for network users to obtain information, and also causes an information overload problem. How to rapidly and effectively search and position needed information from enormous amounts of information becomes a major problem in the current Internet development, and is also a hotspot of the retrieval research of the network information.

To resolve the foregoing problem, in some embodiments, many news websites recommend, to users by using an information recommendation manner such as "related news", "related reading", "more news", "related recommendation", and "extended reading", other information related to news currently displayed on terminals of the users, as expanded reading. At present, information is mostly recommended based on a text TAG recommendation manner: keywords of an information text are extracted and articles are aggregated by using the keywords as indexes, and corresponding articles are indexed according to the keywords during information recommendation. This recommendation manner may have a series of problems as follows:

Problems of semantic ambiguity and semantic relativity of related information cannot be resolved. For example, although two pieces of information "Fuji apples are really good, hurry to buy" and "Apple iphone6 is really good, hurry to buy", are related in word meaning, but are not related semantically. For another example, although the two pieces of information "If time is back to 2006, would Ma Yun and Yang Zhiyuan shake hands" and "Alibaba Group and Yahoo signed a final protocol on share repurchase" are not related in word meaning, but are related semantically.

Because the information heat and the timeliness are not considered, user experience is poor. For example, "84-year-old Murdoch engaged with 59-year-old former super model" and "Priscilla effect VS Wendi Deng rule, there must be a real encounter" and "Asset preservation Ding Yuan and inheritance FO revealing: Family trust that Wendi Deng also cannot defeat", the latter two pieces of information are obviously not related to "Murdoch" in the current case.

In view of this, the embodiments of this application provides a method for recommending text content and a corresponding system, that is, a method for recommending text information and a corresponding system.

Figure 1:
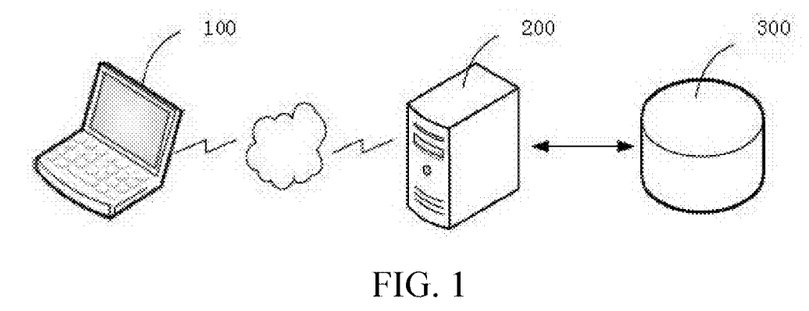
FIG. 1 is an application environment diagram of a method and a system for recommending text content according to embodiments of this application.

Referring to FIG. 1, FIG. 1 is an application environment diagram of a method and a system for recommending text content, that is, text information according to the embodiments of this application. As shown in FIG. 1, a terminal device 100 installed with a browser client is connected to a server 200 through a network, the server 200 is connected to a database 300, the database 300 is configured to store various types of data, such as an information recommendation pool and a model base (such as a Latent Dirichlet Allocation (LDA) model base) in this application, and the database 300 may be independent of the server 200, or may be disposed in the server 200. The terminal device 100 may be various electronic apparatuses, such as a personal computer, a notebook computer, a tablet computer, and a mobile phone. The network includes, but is not limited to, the Internet, an intranet, a local area network, a mobile communications network, and a combination thereof.

Figure 2:
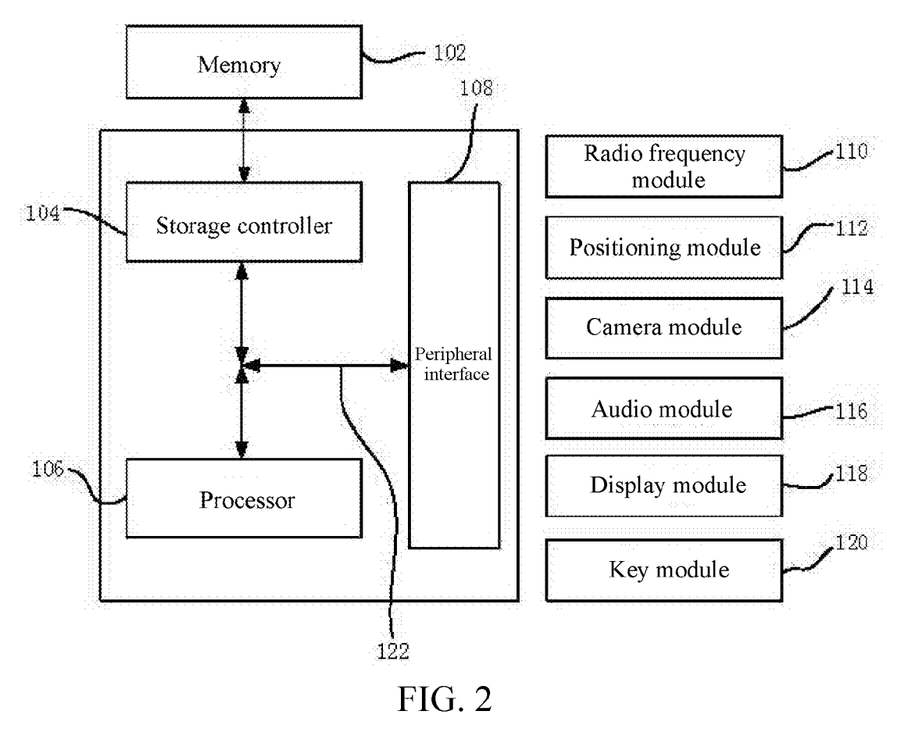
FIG. 2 is a structural block diagram of a terminal device in FIG. 1.

Referring to FIG. 2, FIG. 2 shows a structural block diagram of an embodiment of the terminal device 100. As shown in FIG. 2, the terminal device 100 may include a memory 102, a storage controller 104, one or more processors 106 (one processor is shown in FIG. 2), a peripheral interface 108, a radio frequency module 110, a positioning module 112, a camera module 114, an audio module 116, a display module 118, a key module 120, and the like. These components communicate with each other through one or more communication buses/signal lines 122.

It may be understood that the structure shown in FIG. 2 is for the purpose of illustration, and the terminal device 100 may also include more or fewer components than those shown in FIG. 2, or have a configuration different from that shown in FIG. 2. For example, in some embodiments of this application, the terminal device 100 may include the memory 102, the storage controller 104, the one or more processors 106, and the display module 118. The components shown in FIG. 2 may be implemented by using hardware, software, or a combination thereof.

The memory 102 may be configured to store a software program and module, for example, program instructions/modules corresponding to a method and a system for recommending text information in the embodiments of this application. The processor 106 runs the software program and module stored in the memory 102, to implement various functional applications and data processing, for example, implement the method and a system for recommending text information in the embodiments of this application.

The memory 102 may include a high-speed random memory, and may also include a nonvolatile memory such as one or more magnetic storage systems, a flash memory, or another nonvolatile solid-state memory. In some embodiments, the memory 102 may further include memories remotely disposed relative to the processor 106, and these remote memories may be connected to the terminal device through a network. Instances of the network include, but are not limited to, the Internet, an intranet, a local area network, a mobile communications network, and a combination thereof. The processor 106 and other possible components may access the memory 102 under the control of the memory controller 104.

The peripheral interface 108 couples various input/output devices to the processor 106 and the memory 102. The processor 106 runs various software and instructions inside the memory 102, so as to perform various functions of the terminal device and perform data processing.

In some embodiments, the peripheral interface 108, the processor 106, and the memory controller 104 may be implemented in a single chip. In some other embodiments, they may be separately implemented by an independent chip. In addition, it is noted that, in the embodiments of this application, the peripheral interface 108 is not necessary, but an optional module.

The radio frequency module 110 is configured to receive and send an electromagnetic wave, and implement mutual conversion between the electromagnetic wave and an electric signal, so as to communicate with a communications network or another device. The radio frequency module 110 may include various circuit elements for performing these functions, such as an antenna, a radio frequency transceiver, a digital signal processor, a cipher/decipher chip, a subscriber identity module (SIM) card, and a memory. The radio frequency module 110 may communicate with various networks such as the Internet, an intranet and a wireless network, or communicate with other devices through a wireless network. The wireless network may include a cellular telephone network, a wireless local area network, or a metropolitan area network. The wireless network may use various communications standards, protocols and technologies, which include, but are not limited to, Global System for Mobile Communications (GSM), Enhanced Data GSM Environment (EDGE), Wideband Code Division Multiple Access (W-CDMA), Code Division Multiple Access (CDMA), Time Division Multiple Access (TDMA), Bluetooth, Wireless Fidelity (WiFi) (for example, US Institute of Electrical and Electronic Engineers IEEE 802.11a, IEEE 802.11b, IEEE 802.11g and/or IEEE 802.11n), Voice over Internet Protocol (VoIP), Worldwide Interoperability for Microwave Access (Wi-Max), other protocols for email, instant messaging and short message service, and any other suitable communications protocols, and even may include some protocols that have not been developed. In addition, it is noted that, in the embodiments of this application, the radio frequency module 110 is also not necessary, but an optional module. In this case, the radio frequency module 110 may also be replaced by another communications module, to implement a communications function with the server.

The positioning module 112 is configured to acquire a current location of the terminal device. Instances of the positioning module 112 include, but are not limited to, a Global Positioning System (GPS) and a positioning technology based on a wireless local area network or mobile communications network. It is noted that, in the embodiments of this application, the positioning module 112 is also not necessary, but an optional module.

The camera module 114 is configured to capture a picture or video. The captured picture or video may be stored in the memory 102, and may be sent by using the radio frequency module 110. It is noted that, in the embodiments of this application, the camera module 114 is also not necessary, but an optional module.

The audio module 116 provides an audio interface for a user, and may include one or more microphones, one or more loudspeakers, and an audio circuit. The audio circuit receives audio data from the peripheral interface 108, converts the audio data into electric information, and transmits the electric information to the loudspeaker. The loudspeaker converts the electric information into an acoustic wave audible to the human ear. The audio circuit further receives electric information from the microphone, converts the electric information into audio data, and transmits the audio data to the peripheral interface 108 for further processing. The audio data may be acquired from the memory 102 or by the radio frequency module 110. In addition, the audio data may also be stored in the memory 102 or sent by the radio frequency module 110. In some embodiments, the audio module 116 may further include an earphone jack, for providing an audio interface for an earphone or another device. It is noted that, in the embodiments of this application, the audio module 116 is also not necessary, but an optional module.

The display module 118 provides an output interface between the terminal device 100 and the user. Specifically, the display module 118 displays a video output to the user, and content of the video output may include texts, images, videos, or any combination thereof. Some output results correspond to some user interface objects. Further, the display module 118 may further provide an input interface between the terminal device 100 and the user for receiving an input of the user, such as tapping, sliding, or other gesture operations of the user, so that the user interface object responds to the input of the user. The technology for detecting the input of the user may be a resistive touch detection technology, a capacitive touch detection technology, or any other possible touch detection technologies. Specific examples of the display module 118 include but are not limited to a liquid crystal display and a light-emitting polymer display.

The key module 120 also provides an interface for the user to input information to the terminal device 100, and the user may press different keys to enable the terminal device to perform different functions. It is noted that, in the embodiments of this application, the key module 120 is also not necessary, but an optional module. In this case, the key module 120 may also be replaced by another input module, to implement an input function with the user.

Figure 3:
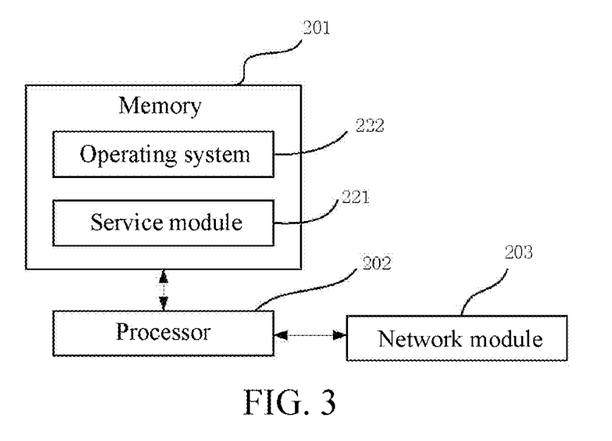
FIG. 3 is a structural block diagram of a server in FIG. 1.

FIG. 3 shows a structural block diagram of an embodiment of the server 200. As shown in FIG. 3, the server 200 includes: a memory 201, a processor 202, and a network module 203.

It may be understood that the structure shown in FIG. 3 is for the purpose of illustration, and the server 200 may also include more or fewer components than those shown in FIG. 3, or have a configuration different from that shown in FIG. 3. The components shown in FIG. 3 may be implemented by using hardware, software, or a combination thereof. In addition, the server 200 in this embodiment of this application may further include multiple servers having different functions.

The memory 201 may be configured to store a software program and module, for example, program instructions/modules corresponding to a method and a system for recommending text information in the embodiments of this application. The processor 202 runs the software program and module stored in the memory 201, to implement various functional applications and data processing, for example, implement the method and a system for recommending text information in the embodiments of this application. The memory 201 may include a high-speed random memory, and may also include a nonvolatile memory such as one or more magnetic storage devices, a flash memory, or another non-volatile solid-state memory. In some embodiments, the memory 201 may further include memories remotely disposed relative to the processor 202, and these remote memories may be connected to the server 200 through a network. Further, the software program and module may further include: a service module 221 and an operating system 222. The operating system 222, for example, may be LINUX, UNIX, or WINDOWS, may include various software component and/or drivers configured to manage system tasks (such as memory management, storage device control, power management), and may communicate with various hardware or software components, so as to provide a running environment for other software components. The service module 221 runs on the basis of the operating system 222, monitors a request from the network by using a network service of the operating system 222, completes corresponding data processing according to the request, and returns a processing result to a client. That is, the service module 221 is configured to provide a network service for the client.

The network module 203 is configured to receive and send a network signal. The network signal may be a wireless signal or a wired signal. In an instance, the network signal is a wired network signal. In this case, the network module 203 may include elements such as a processor, a random memory, a converter, and a crystal oscillator.

The following describes the method and the system for recommending text content (that is, text information) provided in the embodiments of this application with reference to specific embodiments.

The method and the system for recommending text content provided in this application may be applied to a product of a browser for aggregating information. Recommendation information provided in this application is an expansion of information interested by the user, and a related recommendation scenario is generally exposed at the bottom of an article, to play roles of event aggregation and interest aggregation.

Figure 4:
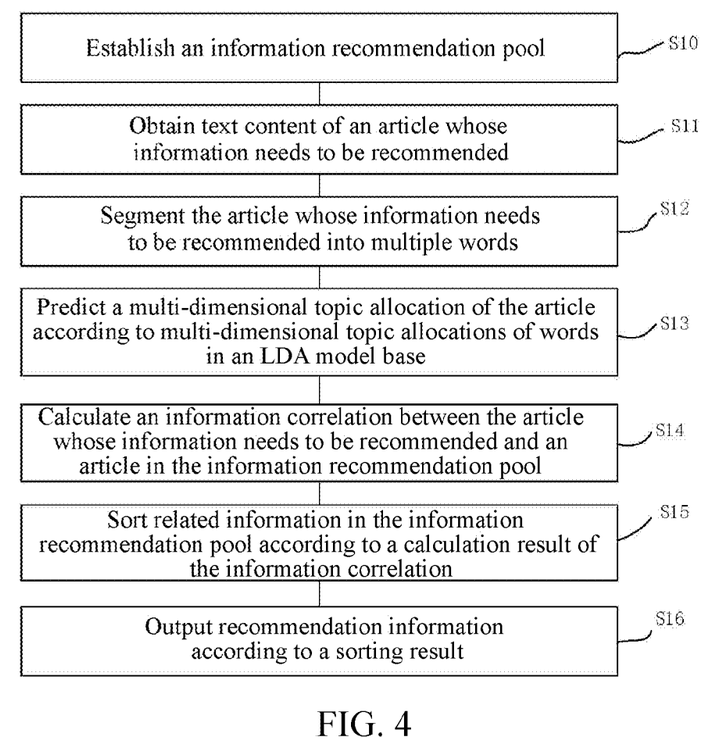
FIG. 4 is a schematic flowchart of a method for recommending text content according to an embodiment of this application.

Referring to FIG. 4, FIG. 4 is a schematic flowchart of a method for recommending text content according to an embodiment of this application. As shown in FIG. 4, the method for recommending text content in this embodiment includes the following steps:

Step S10. Establish an information recommendation pool.

In some embodiments, the information recommendation pool may be pre-built, and the information recommendation pool is pre-stored in the database 300 and/or a buffer of the server 200, and stores multiple articles of information texts. In this application, for ease of description, the information texts stored in the information recommendation pool are also referred to as second text content. The second text content in the information recommendation pool may be expanded reading of news or an article currently displayed on the terminal device 100 of the user.

Step S11. Obtain text content of an article whose information needs to be recommended.

In this step, the article whose information needs to be recommended may be an article opened by a user by clicking a news link on the terminal device 100, or may be an article actively recommended to a user by a website editor according to current hotspot news or a hotspot article in WeChat circles, that is, text content such as news or an article currently displayed on the terminal device 100 of the user. In this application, for ease of description, text content whose information file needs to be recommended is also referred to as first text content. The text content of the article whose information needs to be recommended may be obtained from the database 300 or a local hard disk of the server 200 according to a click request of the user. In this application, "information" and "article" have close meanings, both refer to specific text content, and may refer to news, but "information" not only refers to news content, but also focuses on the heat and the timeliness of news, while "article" focuses on text content of news.

Step S12. Segment the article whose information needs to be recommended into multiple words.

In this step, the first text content is segmented into multiple words. Specifically, in this embodiment of this application, a word segmentation tool may be used to segment an article used as the first text content into single keywords. Algorithms that may be used during word segmentation include but are not limited to algorithms based on string matching, based on understanding, and based on statistical word segmentation.

Step S13. Predict a multi-dimensional topic allocation (distribution) of the article whose information needs to be recommended.

In this embodiment of this application, the prediction step may be predicting the multi-dimensional topic allocation of the article whose information needs to be recommended according to multi-dimensional topic allocations of words in an LDA model base.

The LDA refers to Latent Dirichlet Allocation. An LDA model a topic model, which may show a topic of each document in a document set according to a probability allocation form. In this embodiment of this application, in this step, the LDA model base is pre-stored in the database 300 and/or the buffer of the server 200, and the LDA model base stores the multi-dimensional topic allocations (that is, LDA model) of multiple words. In the article on which word segmentation is performed in step S12, each word corresponds to a specific LDA model. The LDA model is obtained by using a machine learning method and according to an LDA training algorithm of a Gibbs sample, and may be updated periodically according to updated information. When the multi-dimensional topic allocation of the article is predicted according to the multi-dimensional topic allocations of the words in the LDA model base, multi-dimensional topic allocations of the words in the article whose information needs to be recommended may be comprehensively superimposed to predict the multi-dimensional topic allocation of the article whose information needs to be recommended.

In this embodiment, the topic dimension of the article is 500 dimensions. The selection of the data comprehensively considers the topic fine granularity division and the calculation amount. The topic fine granularity division and the calculation amount are balanced, that is, the article is ensured with a high topic fine granularity, and does not involve an excessively large calculation amount. According to researches of the inventor, being over 500 dimensions does not obviously improve the accuracy of a calculation result but significantly increases the calculation amount.

Step S14. Calculate an information correlation between the article whose information needs to be recommended and an article in the information recommendation pool.

That is, in step S14, the calculated correlation between the first text content and each piece of second text content in the information recommendation pool may be referred to as an information correlation. In this embodiment of this application, specifically, the correlation between the first text content and each piece of second text content in the information recommendation pool may be calculated according to the multi-dimensional topic allocation of the first text content and the multi-dimensional topic allocation of each piece of second text content in the information recommendation pool.

In some embodiments of this application, the correlation between the first text content and each piece of second text content in the information recommendation pool may be represented according to a cosine distance between the first text content and the second text content in a multi-dimensional topic space.

Specifically, the formula of calculating the correlation between the first text content and the second text content may be represented by the following formula (1):

$$S(x, x') = \frac{\sum_{k=1}^{n} x_k x'_k}{\sqrt{\sum_{k=1}^{n} x_k^2} \sqrt{\sum_{k=1}^{n} x_k'^2}} \quad (1)$$

In the formula, x is an LDA vector of the first text content, x' is an LDA vector of the second text content, and k is the quantity of LDA vectors in the article.

Formula (1) represents the cosine distance between the first text content and the second text content in the multi-dimensional topic space, so as to make the recommended second text content and first text content be close semantically. A larger cosine distance between an article in the information recommendation pool and the first text content in the multi-dimensional topic space indicates a higher information correlation between the article and the first text content.

Further, because the news and the article generally have timeliness and topicality, to further consider the timeliness and the heat of the recommended second text content in a content recommendation process, in some embodiments of this application, apart from considering the cosine distance between the first text content and the second text content in the information recommendation pool in the multi-dimensional topic space, a page view weight (PV weight) and an overdue penalty of the second text content in the information recommendation pool may be further considered.

In this case, specifically, the formula of calculating the correlation between the first text content and the second text content may be represented by the following formula (2):

$$S(x, x', v, t) = \frac{\sum_{k=1}^{n} x_k x'_k}{\sqrt{\sum_{k=1}^{n} x_k^2} \sqrt{\sum_{k=1}^{n} x_k'^2}} + \lambda \frac{\log v}{(t+b)^{\gamma}} \quad (2)$$

In the formula, x is an LDA vector of the article whose information needs to be recommended (first text content), x' is an LDA vector of the article (second text content) in the information recommendation pool, k is the quantity of LDA vectors in the article, v is a pv (page view, or hits, which are generally a main indicator for measuring a network news channel or website or even a piece of network news) heat of information (second text content) in the information recommendation pool, that is, a click rate of an article, t is an overdue time of the information (second text content) in the information recommendation pool, that is, a time difference between an information release time and a current time, b is a bias smooth of the overdue time of the information (second text content) in the information recommendation pool, $\gamma$ is an overdue scale adjustment coefficient of the information (second text content) in the information recommendation pool, and $\lambda$ is a regression coefficient.

As described above, the first term in the foregoing formula (2) is a cosine distance between the article whose information needs to be recommended and the article in the information recommendation pool in the multi-dimensional topic space, so as to make the recommended article (second text content) and the article whose information needs to be recommended (first text content) be close semantically. A larger cosine distance between an article in the information recommendation pool and the article whose information needs to be recommended in the multi-dimensional topic space indicates a higher information correlation between the article and the article whose information needs to be recommended.

The numerator of the second term in formula (2) is a PV weight of the information (second text content, the log operation is performed because the click rate of the information article and the heat of the information article increase exponentially, and may be used as linear parameters after the log operation is performed, so as to improve the impact of the information heat on the information article correlation.

The denominator of the second term in formula (2) is performing penalty and decay on an overdue degree of the information article (second text content), so as to suppress old information articles, to ensure that information recommended to the user is relatively new information.

In one aspect, the value of b in formula (2) may prevent the denominator of the second term of the formula from being 0 when the information is latest information, that is, when the value oft is 0. In another aspect, the sensitivity of the information to time may be adjusted, so that information that occurs at that day is not excessively sensitive to time. For example, when the value of b is 5, if the value oft is small (representing that a time between the information release time and the current time is very short, that is, the information is very new), such as 1 (representing that the information has been overdue for 1 hour) and 2 (representing that the information has been overdue for 2 hours), the impact on the article information correlation is small.

The value of $\lambda$ in the formula may be obtained by using a linear regression algorithm according to a CTR (click-through-rate) result. In this embodiment, the value of $\lambda$ is 0.25, so as to make the values of the first term and the second term of the formula be relatively close, to make the impact of the first term of the formula for the article information correlation be close to the impact of the second term for the article information correlation. This mainly plays a balancing role.

The value of $\gamma$ in the formula may be slightly adjusted, and is a value with the greatest CTR gain in solutions A and B by using an A/B Test method. In this embodiment, the value of $\gamma$ is 1.5.

Step S15. Sort related information in the information recommendation pool according to a calculation result of the information correlation.

In this step, information correlation sorting is performed on the information according to the value of S(x,x',v,t) obtained through calculation in step S15 and according to a descending sequence. A larger value indicates a higher information correlation.

Step S16. Output recommendation information according to a sorting result.

In this step, information displayed to the user when the recommendation information is output is not all information in a recommendation information sequence, but the front sorted several pieces (for example, 5 pieces) of information displayed according to a specified or default standard.

In this embodiment, step S15 and step S16 are an embodiment of this application. In some other embodiments of this application, after the correlation between the first text content and the second text content is obtained through calculation in step S14, at least one piece of second text content may be output according to the calculation result of the correlation. For example, at least one piece of output second text content may be determined according to the sorting method described in the foregoing step S15 and step S16. For another example, a correlation threshold may be further preset. When a correlation between a piece of second text content and a piece of first text content reaches the preset threshold, the second text content may be used as recommended text content to be output.

Figure 5:
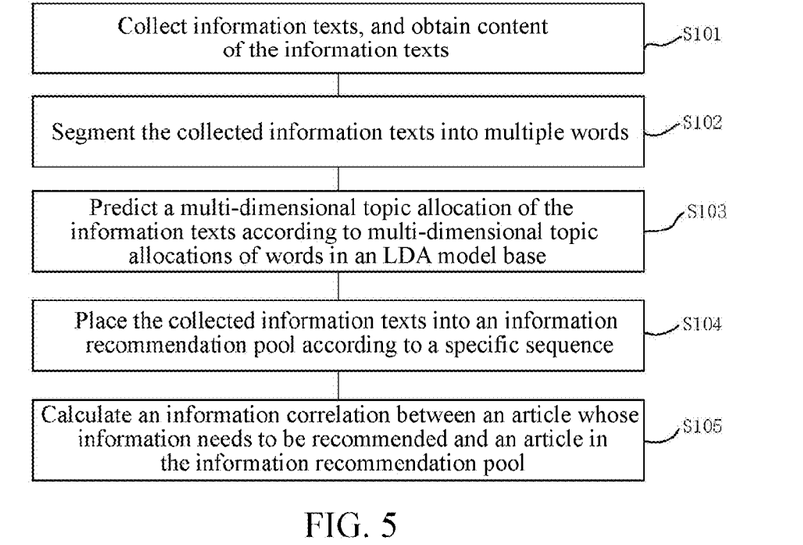
FIG. 5 is a schematic flowchart of main steps of step S10 in FIG. 4.

In addition, as shown in FIG. 5, according to an embodiment of this application, step S10 of establishing an information recommendation pool may include:

Step S101. Collect information texts, and obtain content of the information texts.

In this step, the obtained content of the information texts may be used as second text content. The information texts may be various types of news obtained from other news websites, or may be various types of news directly obtained from the server 200 or the database 300. The text content of the information texts may obtained by a server of another news website or directly obtained from the database 300 or the server 200.

Step S102. Segment the collected information texts into multiple words.

In this step, that is, the obtained second text content is segmented to obtain multiple keywords. Specifically, in some embodiments of this application, a word segmentation tool may be used to segment an article into single keywords. Algorithms that may be used during word segmentation include but are not limited to algorithms based on string matching, based on understanding, and based on statistical word segmentation.

Step S103. Predict a multi-dimensional topic allocation of the information texts (second text content) according to multi-dimensional topic allocations of words in an LDA model base.

In this step, the LDA model base is pre-stored in the database 300 and/or a buffer of the server 200, and the LDA model base stores the multi-dimensional topic allocation (that is, LDA model) of multiple words. In the information texts on which word segmentation is performed in step S102, each word corresponds to a specific LDA model. The LDA model is obtained by using a machine learning method and according to an LDA training algorithm of a Gibbs sample, and may be updated periodically according to updated information. When the multi-dimensional topic allocations of the information texts are predicted according to the multi-dimensional topic allocations of the words in the LDA model base, multi-dimensional topic allocations of the words in the information texts may be comprehensively superimposed to predict the multi-dimensional topic allocations of the information texts. In this embodiment, the topic dimension of the article is 500 dimensions. The selection of the data comprehensively considers the topic fine granularity division and the calculation amount. The topic fine granularity division and the calculation amount are balanced, that is, the article is ensured with a high topic fine granularity, and does not involve an excessively large calculation amount. According to researches of the inventor, being over 500 dimensions does not obviously improve the accuracy of a calculation result but significantly increases the calculation amount.

Step S104. Place the collected information texts into an information recommendation pool according to a specific sequence.

Herein, the placing the collected information texts into the information recommendation pool according to a specific sequence is an embodiment of this application. The sequence may be pre-determined, for example, according to the category of the information text, the quantity of repeated words in the information text, an information text receiving time sequence, or a preset sequence.

As described above, the information text in the information recommendation pool may be stored according to categories of the information texts, or may be stored according to the quantity of repeated words in the information texts, or may be stored according to the information text receiving time sequence. The quantity of repeated words in the information texts refers to the quantity of same words in two or more information texts. The larger quantity of same words in different information texts indicates that the categories of the information texts are closer or have a higher similarity.

If the information texts are stored according to the categories of the texts or the quantity of repeated words, when the information correlation between the article whose information needs to be recommended and the article in the information recommendation pool is calculated in step S14, an article whose category is close to that of the article whose information needs to be recommended or an article with the larger quantity of repeated words may be calculated. Therefore, the involved calculation amount is relatively small, the calculation speed is relatively fast, and the article may be used for online recommendation. If the information texts are stored according to the text receiving time sequence, when the information correlation between the article whose information needs to be recommended and the article in the information recommendation pool is calculated in step S14, all articles in the information recommendation pool need to be traversed to calculate the information correlation. Therefore, the calculation amount is relatively large, the calculation speed is relatively slow, and the information correlation needs to be calculated offline.

Figure 6:
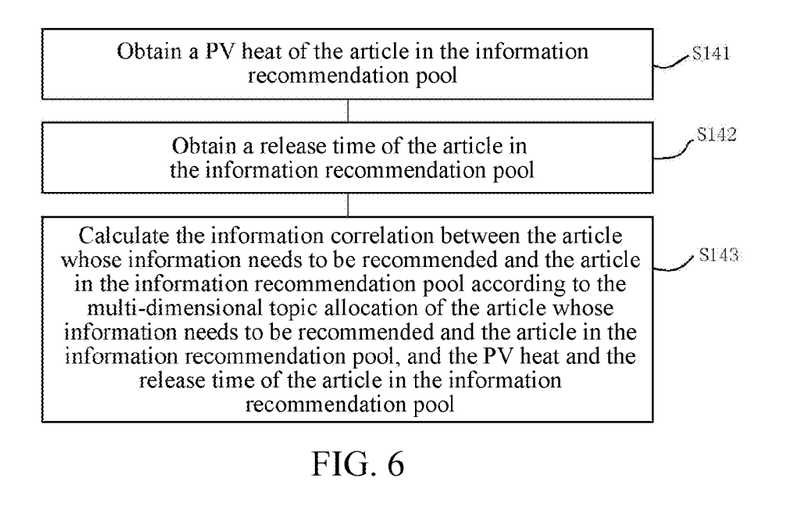
FIG. 6 is a schematic flowchart of main steps of step S14 in FIG. 4.

Further, in step S14, the information correlation between the article whose information needs to be recommended and the article in the information recommendation pool is represented by the cosine distance between the article whose information needs to be recommended and the article in the information recommendation pool in the multi-dimensional topic space, and the PV weight and the overdue penalty of the article in the information recommendation pool. Therefore, as shown in FIG. 6, the method for recommending text information of this application further includes:

Step S141. Obtain a click rate (or PV heat) of the article (second text content) in the information recommendation pool.

Step S142. Obtain a release time of the article in the information recommendation pool.

Step S143. Calculate the information correlation between the article whose information needs to be recommended and the article in the information recommendation pool according to the multi-dimensional topic allocation of the article whose information needs to be recommended and the article in the information recommendation pool, and the PV heat and the release time of the article in the information recommendation pool.

In conclusion, in this embodiment, because when the information correlation between the article whose information needs to be recommended and the article in the information recommendation pool is calculated, calculation is performed not only for all keywords in the article, but the context of the article needs to be considered, thereby resolving the problems of semantic ambiguity and semantic relativity of the article. The impact of the information heat and the timeliness for the information correlation is further considered, user experience is improved, and an information PV conversion rate (a ratio of the PV times of clicking the information to the PV times of information exposure (it is assumed that every five pieces of exposed information are one exposure)) is greatly increased by nearly 200%.

For example, if the word "banana" appears in the context of an information paragraph with the word "apple", it is more likely that the topic allocation of a superimposed article tends to the topic allocation of the "fruit apple", but not the topic allocation of the "mobile phone Apple". For another example, according to a word clustering feature of the LDA, "Ma Yun" and "Alibaba" are very close in the topic allocation. Therefore, information about Ma Yun and information about Alibaba are aggregated into one category as related information, to be an expansion of the related recommend. For another example, because the information heat and the timeliness are considered during calculation, the overdue information such as "Priscilla effect VS Wendi Deng rule, there must be a real encounter" and "asset preservation I Ding Yuan and inheritance FO revealing: Family trust that Wendi Deng also cannot defeat" may be filtered out when information recommendation is performed on "84-year-old Murdoch engaged with 59-year-old former super model".

Figure 7:
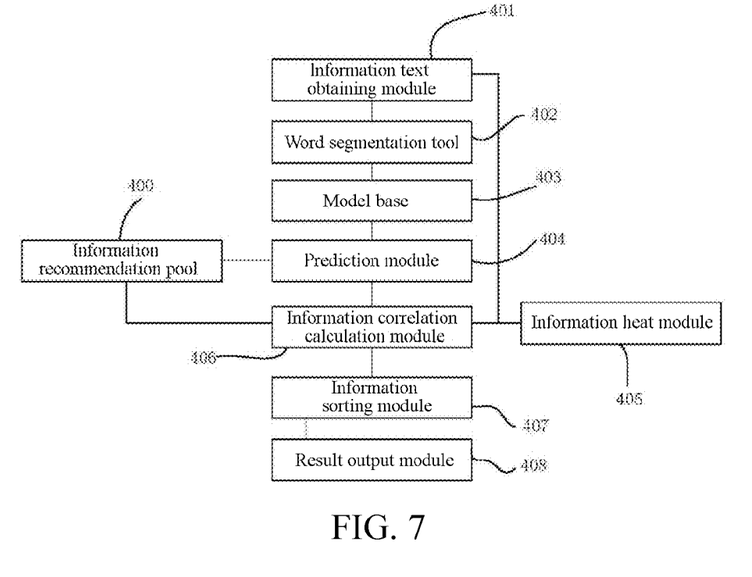
FIG. 7 is a schematic flowchart of a method for recommending text content according to another embodiment of this application.

Another embodiment of this application provides a system for recommending text information, configured to implement the method for recommending text information in the foregoing embodiments. As shown in FIG. 7, the system for recommending text information includes an information recommendation pool 400, an information text obtaining module 401, a word segmentation tool 402, a model base 403, a prediction module 404, an information heat module 405, an information correlation calculation module 406, an information sorting module 407, and a result output module 408.

The information recommendation pool 400 is pre-stored in the database 300 and/or a buffer of the server 200, and stores multiple articles of information texts. The information texts stored in the information recommendation pool 400 may be various types of news obtained from other news websites by the information text obtaining module 401, or may be various types of news directly obtained from the server 200 or the database 300 by the information text obtaining module 401. The text content of the information texts may obtained by a server of another news website or directly obtained from the database 300 or a local hard disk of the server 200. The obtained information texts are first segmented into multiple words by the word segmentation tool 402, then a multi-dimensional topic allocation of the article in the information recommendation pool 400 is predicted by using the prediction module 404 according to multi-dimensional topic allocations of words in the model base 403, and finally, the information texts are stored into the information recommendation pool 400 according to a specific sequence. The collected information texts in the information recommendation pool may be stored according to categories of the information texts, or may be stored according to the quantity of repeated words in the information texts, or may be stored according to an information text receiving time sequence. The quantity of repeated words in the information text refers to the quantity of same words in two or more information texts. The larger quantity of same words in different information texts indicates that the categories of the information texts are closer or have a higher similarity. If the information texts are stored according to the categories of the texts or the quantity of repeated words, when the information correlation between the article whose information needs to be recommended and the article in the information recommendation pool is calculated, an article whose category is close to that of the article whose information needs to be recommended or an article with the larger quantity of repeated words may be calculated. Therefore, the involved calculation amount is relatively small, the calculation speed is relatively fast, and the article may be used for online recommendation. If the information texts are stored according to the text receiving time sequence, when the information correlation between the article whose information needs to be recommended and the article in the information recommendation pool is calculated, all articles in the information recommendation pool need to be traversed to calculate the information correlation. Therefore, the calculation amount is relatively large, the calculation speed is relatively slow, and the information correlation needs to be calculated offline.

The information text obtaining module 401 is configured to obtain text content of an article and a release time of information. The article may be the article whose information needs to be recommended, or may be an article in the information recommendation pool 400. The article whose information needs to be recommended may be an article opened by a user by clicking a news link on the terminal device 100, or may be an article actively recommended to a user by a website editor according to current hotspot news or a hotspot article in WeChat circles, that is, text content such as news or an article currently displayed on the terminal device 100 of the user. The text content and the release time of the article whose information needs to be recommended may be obtained from the database 300 or the local hard disk of the server 200 according to a click request of the user.

The word segmentation tool 402 is configured to segment the article into multiple words. The article may be the article whose information needs to be recommended, or may be an article in the information recommendation pool 400. Algorithms that may be used during word segmentation include but are not limited to algorithms based on string matching, based on understanding, and based on statistical word segmentation.

The model base 403 is pre-stored in the database 300 and/or a buffer of the server 200, and stores multi-dimensional topic allocations of the multiple words. For example, the model base 403 may be an LDA model base. In this case, in the article on which word segmentation is performed, each word corresponds to a specific LDA model. The LDA model is obtained by using a machine learning method and according to an LDA training algorithm of a Gibbs sample, and is updated periodically according to updated information.

The prediction module 404 is configured to predict a multi-dimensional topic allocation of the article according to the multi-dimensional topic allocations of the words in the article. Specifically, the prediction module 404 may comprehensively superimpose the multi-dimensional topic allocations of the words in the article to predict the multi-dimensional topic allocation of the article. The article may be the article whose information needs to be recommended, or may be an article in the information recommendation pool 400. In some embodiments of this application, the prediction module 404 predicts the multi-dimensional topic allocation of the article according to the LDA model base. In this embodiment, the topic dimension of the LDA is 500 dimensions. The selection of the data comprehensively considers the topic fine granularity division and the calculation amount. The topic fine granularity division and the calculation amount are balanced, that is, the article is ensured with a high topic fine granularity, and does not involve an excessively large calculation amount. According to researches of the inventor, being over 500 dimensions does not obviously improve the accuracy of a calculation result but significantly increases the calculation amount.

The information heat module 405 is configured to obtain a PV heat of the information. The PV heat of the information is PV hits of the information.

The information sorting module 407 is configured to calculate an information correlation between the article whose information needs to be recommended and the article in the information recommendation pool according to the multi-dimensional topic allocation of the article. The information correlation between the article whose information needs to be recommended and the article in the information recommendation pool is represented by a cosine distance between the article whose information needs to be recommended and the article in the information recommendation pool in a multi-dimensional topic space; or represented by a cosine distance between the article whose information needs to be recommended and the article in the information recommendation pool in a multi-dimensional topic space, and a PV weight and an overdue penalty of the article in the information recommendation pool. The information correlation calculation module calculates the information correlation between the article whose information needs to be recommended and the article in the information recommendation pool according to the multi-dimensional topic allocation of the article whose information needs to be recommended and the article in the information recommendation pool, and the PV heat and the release time of the article in the information recommendation pool. For the formula of calculating the article information correlation, reference may be made to the foregoing formulas (1) and (2).

The information sorting module 407 is configured to sort related information in the information recommendation pool according to a calculation result of the information correlation. Specifically, the information sorting module 407 performs information correlation sorting on the information according to a descending sequence and according to a calculated information correlation value. A larger value indicates a higher information correlation.

The result output module 408 is configured to output recommendation information according to a sorting result. In this step, information displayed to the user when the recommendation information is output by the result output module 408 is not all information in a recommendation information sequence, but the front sorted several pieces (for example, 5 pieces) of information displayed according to a specified or default standard.

As described above, the foregoing manner of performing information correlation sorting on the information in a descending sequence according to an information correlation value and outputting recommendation information according to a sorting result is an embodiment. In this embodiment of this application, the result output module 408 may output at least one piece of second text content according to the correlation between the first text content and the second text content. Apart from the manner of performing sorting according to the correlation, a correlation threshold may be further preset. When the correlation is greater than the threshold, the second text content may be output.

In conclusion, in this embodiment, because when the information correlation between the article whose information needs to be recommended and the article in the information recommendation pool is calculated, calculation is performed not only for all keywords in the article, but the context of the article needs to be considered, thereby resolving the problems of semantic ambiguity and semantic relativity of the article.

In addition, in some embodiments of this application, the impact of the information heat and the timeliness for the information correlation is further considered, user experience is improved, and an information PV conversion rate is greatly increased by nearly 200%.

It is noted that the embodiments in this specification are all described in a progressive manner. Description of each of the embodiments focuses on differences from other embodiments, and reference may be made to each other for the same or similar parts among respective embodiments. The system embodiments are substantially similar to the method embodiments and therefore are only briefly described, and reference may be made to the method embodiments for the associated part.

It is noted that the relational terms herein such as first and second are used to differentiate an entity or operation from another entity or operation, and do not require or imply any actual relationship or sequence between these entities or operations. Moreover, the terms "include", "comprise", and any variants thereof are intended to cover a non-exclusive inclusion. Therefore, in the context of a process, method, object, or device that includes a series of elements, the process, method, object, or system not only includes such elements, but also includes other elements not specified expressly, or may include inherent elements of the process, method, object, or system. Unless otherwise specified, an element limited by "include a/an . . . " does not exclude other same elements existing in the process, the method, the article, or the system that includes the element.

A person of ordinary skill in the art may understand that all or some of the steps of the foregoing embodiments may be implemented by using hardware, or may be implemented by a program instructing relevant hardware. The program may be stored in a computer readable storage medium. The above-mentioned storage medium may be a read-only memory, a magnetic disk, an optical disc, or the like.

The above descriptions are merely embodiments of this application, and are not intended to limit this application in any form. Although this application has been disclosed above through the embodiments, the embodiments are not intended to limit this application. A person skilled in the art can make some equivalent variations, alterations or modifications to the above-disclosed technical content without departing from the scope of the technical solutions of this application to obtain equivalent embodiments. Any simple alteration, equivalent change or modification made to the above embodiments according to the technical essence of this application without departing from the content of the technical solutions of this application shall fall within the scope of the technical solutions of this application.

What is claimed is:

1. A method for information recommendation, comprising:

obtaining, by processing circuitry of an information processing apparatus, a first text content;
segmenting the first text content into multiple words;
predicting, by the processing circuitry, a distribution of the first text content in a multi-dimensional topic space based on the multiple words;
calculating, by the processing circuitry, multiple correlations between the first text content and multiple candidate text contents in an information pool, respectively, according to the distribution of the first text content in the multi-dimensional topic space, wherein the correlation between the first text content and one of the multiple candidate text contents is based on at least a cosine distance S(x,x') between the first text content and the one of the multiple candidate text contents in the multi-dimensional topic space calculated according to a first equation:

$$S(x, x',) = \frac{\sum_{k=1}^{n} x_k x'_k}{\sqrt{\sum_{k=1}^{n} x_k^2} \sqrt{\sum_{k=1}^{n} x_k'^2}},$$

x represents first vectors of the first text content in the multi-dimensional topic space according to a Latent Dirichlet Allocation (LDA) model,
x' represents second vectors of the one of the multiple candidate text contents in the multi-dimensional topic space according to the LDA model, and
k represents indexes for the first vectors and the second vectors in summations;
sorting, by the processing circuitry, the multiple candidate text contents according to the correlations;
determining, by the processing circuitry, whether to output one or more of the multiple candidate text contents as a recommendation associated with the first text content according to the correlations; and
outputting, via interface circuitry of the information processing apparatus, the one or more of the multiple candidate text contents according to the sorting when the one or more of the multiple candidate text contents are determined to be output as the recommendation.

2. The method according to claim 1, wherein the predicting the distribution of the first text content in the multi-dimensional topic space based on the multiple words comprises:
predicting the distribution of the first text content in the multi-dimensional topic space according to the LDA model.

3. The method according to claim 1, further comprising:
outputting, via the interface circuitry of the information processing apparatus, the one of the multiple candidate text contents when the correlation between the first text content and the one of the multiple candidate text contents is higher than a preset threshold.

4. The method according to claim 1, further comprising:
calculating, by the processing circuitry, the correlation between the first text content and the one of the multiple candidate text contents according to the cosine distance between the first text content and the one of the multiple candidate text contents in the multi-dimensional topic space, a page view (PV) weight of the one of the multiple candidate text contents, and an overdue penalty of the one of the multiple candidate text contents.

5. The method according to claim 4, further comprising:
receiving, from the information pool, the PV weight of the one of the multiple candidate text contents that is determined according to a click rate of the one of the multiple candidate text contents; and
receiving, from the information pool, the overdue penalty of the one of the multiple candidate text contents that is determined according to a released time from an initial release of the one of the multiple candidate text contents.

6. The method according to claim 4, wherein
the correlation between the first text content and the one of the multiple candidate text contents is calculated according to a second equation:

$$S(x, x', v, t) = \frac{\sum_{k=1}^{n} x_k x'_k}{\sqrt{\sum_{k=1}^{n} x_k^2} \sqrt{\sum_{k=1}^{n} x_k'^2}} + \lambda \frac{\log v}{(t+b)^\gamma},$$

v represents a click rate of the one of the multiple candidate text contents,
t represents a released time from an initial release of the one of the multiple candidate text contents,
b represents a bias smooth of the released time,
γ represents an overdue scale adjustment coefficient of the one of the multiple candidate text contents,
λ represents a regression coefficient,
log v represents the PV weight of the one of the multiple candidate text contents, and
$(t+b)^\gamma$ represents the overdue penalty of the one of the multiple candidate text contents.

7. The method according to claim 6, wherein the λ is 0.25, and the γ is 1.5.

8. The method according to claim 1, further comprising:
collecting a new piece of information;
obtaining text content of the new piece of information as a new candidate text content;
segmenting the new candidate text content into multiple words;
predicting, by the processing circuitry, a distribution of the new candidate text content in the multi-dimensional topic space; and
placing the new candidate text content into the information pool.

9. The method according to claim 8, wherein the predicting the distribution of the new candidate text content in the multi-dimensional topic space comprises:
predicting, by the processing circuitry, the distribution of the new candidate text content in the multi-dimensional topic space according to the LDA model.

10. An apparatus, comprising:
interface circuitry; and
processing circuitry coupled with the interface circuitry and configured to:
obtain, via the interface circuitry, a first text content;
segment the first text content into multiple words;
predict a distribution of the first text content in a multi-dimensional topic space based on the multiple words;

calculate multiple correlations between the first text content and multiple candidate text contents in an information pool, respectively, according to the distribution of the first text content in the multi-dimensional topic space, wherein
the correlation between the first text content and one of the multiple candidate text contents is based on at least a cosine distance S(x,x') between the first text content and the one of the multiple candidate text contents in the multi-dimensional topic space calculated according to a first equation:

$$S(x, x',) = \frac{\sum_{k=1}^{n} x_k x'_k}{\sqrt{\sum_{k=1}^{n} x_k^2} \sqrt{\sum_{k=1}^{n} x_k'^2}},$$

x represents first vectors of the first text content in the multi-dimensional topic space according to a Latent Dirichlet Allocation (LDA) model,
x' represents second vectors of the one of the multiple candidate text contents in the multi-dimensional topic space according to the LDA model, and
k represents indexes for the first vectors and the second vectors in summations;
sort the multiple candidate text contents according to the correlations;
determine whether to output one or more of the multiple candidate text contents via the interface circuitry as a recommendation associated with the first text content according to the correlations; and
output, via the interface circuitry, the one or more of the multiple candidate text contents according to the sorting when the one or more of the multiple candidate text contents are determined to be output as the recommendation.

11. The apparatus according to claim 10, wherein the processing circuitry is configured to calculate the correlation between the first text content and the one of the multiple candidate text contents according to the cosine distance between the first text content and the one of the multiple candidate text contents in the multi-dimensional topic space, a page view (PV) weight of the one of the multiple candidate text contents and an overdue penalty of the one of the multiple candidate text contents.

12. The apparatus according to claim 10, wherein the processing circuitry is configured to:
predict the distribution of the first text content in the multi-dimensional topic space according to the LDA model.

13. The apparatus according to claim 11, wherein
the correlation between the first text content and the one of the multiple candidate text contents is calculated according to a second equation:

$$S(x, x', v, t) = \frac{\sum_{k=1}^{n} x_k x'_k}{\sqrt{\sum_{k=1}^{n} x_k^2} \sqrt{\sum_{k=1}^{n} x_k'^2}} + \lambda \frac{\log v}{(t+b)^\gamma},$$

v represents a click rate of the one of the multiple candidate text contents,
t represents a released time from an initial release of the one of the multiple candidate text contents,
b represents a bias smooth of the released time,
γ represents an overdue scale adjustment coefficient of the one of the multiple candidate text contents,
λ represents a regression coefficient,
log v represents the PV weight of the one of the multiple candidate text contents, and
(t+b)$^\gamma$ represents the overdue penalty of the one of the multiple candidate text contents.

14. A non-transitory computer-readable medium storing instructions which when executed by a computer cause the computer to perform:
obtaining a first text content;
segmenting the first text content into multiple words;
predicting a distribution of the first text content in a multi-dimensional topic space based on the multiple words;
calculating multiple correlations between the first text content and multiple candidate text contents in an information pool, respectively, according to the distribution of the first text content in the multi-dimensional topic space, wherein
the correlation between the first text content and one of the multiple candidate text contents is based on at least a cosine distance S(x,x') between the first text content and the one of the multiple candidate text contents in the multi-dimensional topic space calculated according to a first equation:

$$S(x, x',) = \frac{\sum_{k=1}^{n} x_k x'_k}{\sqrt{\sum_{k=1}^{n} x_k^2} \sqrt{\sum_{k=1}^{n} x_k'^2}},$$

x represents first vectors of the first text content in the multi-dimensional topic space according to a Latent Dirichlet Allocation (LDA) model,
x' represents second vectors of the one of the multiple candidate text contents in the multi-dimensional topic space according to the LDA model, and
k represents indexes for the first vectors and the second vectors in summations;
sorting the multiple candidate text contents according to the correlations;
determining whether to output one or more of the multiple candidate text contents as a recommendation associated with the first text content according to the correlations; and
outputting the one or more of the multiple candidate text contents according to the sorting when the one or more of the multiple candidate text contents are determined to be output as the recommendation.

15. The non-transitory computer-readable medium according to claim 14, wherein the instructions which when executed by the computer further cause the computer to perform:
calculating the correlation between the first text content and the one of the multiple candidate text contents according to the cosine distance between the first text content and the one of the multiple candidate text contents in the multi-dimensional topic space, a page view (PV) weight of the one of the multiple candidate text contents, and an overdue penalty of the one of the multiple candidate text contents.

16. The non-transitory computer-readable medium according to claim 15, wherein
the correlation between the first text content and the one of the multiple candidate text contents is calculated according to a second equation:

$$S(x, x', v, t) = \frac{\sum_{k=1}^{n} x_k x'_k}{\sqrt{\sum_{k=1}^{n} x_k^2} \sqrt{\sum_{k=1}^{n} x'^2_k}} + \lambda \frac{\log v}{(t+b)^{\gamma}},$$

v represents a click rate of the one of the multiple candidate text contents, t represents a released time from an initial release of the one of the multiple candidate text contents, b represents a bias smooth of the released time, γ represents an overdue scale adjustment coefficient of the one of the multiple candidate text contents, λ represents a regression coefficient, log v represents the PV weight of the one of the multiple candidate text contents, and $(t+b)^{\gamma}$ represents the overdue penalty of the one of the multiple candidate text contents.

\* \* \* \* \*